July 1, 1924.
L. RAVIER
LOCK NUT
Original Filed Dec. 15, 1920
1,499,873
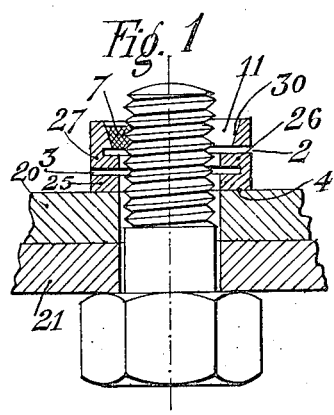
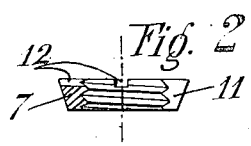
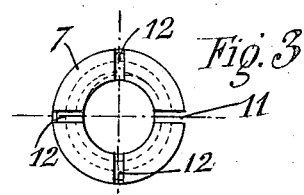
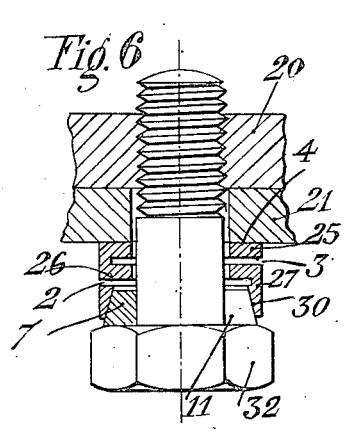
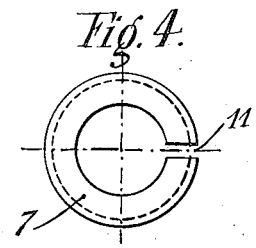
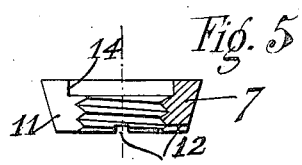
Inventor:
Léopold Ravier
By ⟨signature⟩
Atty.

Patented July 1, 1924.

1,499,873

UNITED STATES PATENT OFFICE.

LÉOPOLD RAVIER, OF PARIS, FRANCE.

LOCK NUT.

Original application filed December 15, 1920, Serial No. 430,813. Divided and this application filed October 6, 1921. Serial No. 505,897.

*To all whom it may concern:*

Be it known that I, LÉOPOLD RAVIER, citizen of the Republic of France, residing at 48 Rue Chateau-Landon, Paris, France, have invented certain new and useful Improvements in Lock Nuts, of which the following is a specification.

This invention refers to improvements in lock-nuts described in my application Ser. No. 430813, filed Dec. 15, 1920, of which this is a division.

The lock nut device according to the present invention comprises essentially the combination of a ring provided with an inner bore, and made resilient by saw-cuts normal to the axis of the said ring, and an extensible conical ring in engagement with the stem of the connecting member, such as a screw bolt. The resilient bored ring is compressed between the conical ring and the parts which are held together by the said member, with which the conical ring is constantly forced in engagement.

Various embodiments of my new lock-nut are illustrated in the accompanying drawing, wherein, Fig. 1 is a longitudinal section through a locking device in accordance with the present invention, in which the nut is shown mounted on the threaded end of a screw bolt; Figs. 2 and 3 are respectively a cross-section and a plan view of the extensible conical ring shown in Fig. 1; Fig. 4 is a plan view of a modification of the said extensible conical ring as used in connection with the construction shown in Fig. 6; Fig. 5 is a cross-section of another modification of the said extensible conical ring, and Fig. 6 is a longitudinal section through a locking device according to the present invention, in which the nut is mounted between the head of the screw bolt and the parts into which the screw bolt is screwed.

Fig. 1 shows in the unlocked position a construction in accordance with the present invention, comprising a ring 27 with an inner bore of a greater diameter than that of the screw bolt, and made resilient by two opposed saw-cuts 2 and 3 extending about for three quarters of the said ring, and both provided near the base of the same. By these two saw-cuts are produced in the ring two resilient tongues 25 and 26. The location of these saw-cuts, their number and dimensions can of course be modified without a departure from the spirit of the invention.

A conical mortise 30 is provided in the upper portion of the ring 27, an extensible conical ring 7 having inner threads is screwed on the stem of the screw bolts, so as to engage the said conical mortise 30. The said two rings 27 and 7 together thus constitute a resilient lock nut.

As will be readily seen, the elastic ring 27 which in fact forms a spring, is strongly compressed between the conical ring 7 and one of the two parts 20 and 21 held together by the screw bolt. This resilient ring 27 when thus compressed in turn exerts a strong pressure on the extensible conical ring 7, whose threads thereby are forced in engagement with the threads of the threaded stem of the screw bolt, whereby the unintentional unscrewing of the device is made absolutely impossible.

The conical ring 7 can of course be made extensible by various means, as for instance, by a saw-cut 11 (Figs. 2–5) extending through the entire height of the ring. Instead of being made extensible by a single saw-cut 11 extending through the entire height of the ring, the ring 7 can be provided in addition to the saw-cut 11 with radial saw-cuts, extending only through a portion of the ring, and provided in the upper face thereof. Thus, as shown in Figs. 2 and 3, saw-cuts 12, or other recesses may be provided in the larger face of the ring, which saw-cuts may be engaged by a special key. The same saw-cuts 12 however may also be provided in the smaller face of the ring as shown in Fig. 5.

As shown in Fig. 6, the two rings, i. e. the resilient ring 27 and the extensible conical ring 7 can also be located between the head 32 of the screw bolt and one of the parts 20 and 21 to be held together by the screw bolt, and one of which is provided with threads to be engaged by the threaded portion of the stem of the screw bolt.

In assembling the parts of the locking device shown in Fig. 6, one first places over the stem of the screw bolt the extensible conical ring 7, having a bore of a diameter fitting the stem of the screw bolt in such a way that the larger face of the ring 7 will abut against the head 32 of the screw bolt. Thereupon, one places on the stem of the screw bolt the elastic ring 27, so that its conical mortise 30 engages the conical outer wall of the extensible ring 7. Finally, one screws the threaded portion of the stem of the screw bolt onto the part 20 of the parts 20, 21 to be held together until the device is locked. After the locking of the device, the larger face of the extensible conical ring 7 will project relative to the inner face of the resilient ring 27, the inner conical surface of which forcibly engages the outer conical surface of the extensible conical ring 7.

In the construction according to Fig. 6, one can substitute for the bored extensible conical ring, a threaded extensible conical ring, such as shown in Figs. 2 and 3, or a threaded conical ring, such as shown in Fig. 5, which is provided with a bored portion 14 fitting the stem of the screw bolt near the head 32 thereof, whereas the other portion of the said stem is screw-threaded to be engaged by the threaded portion of the said ring 7, as shown in Fig. 5.

All these types of unscrewable nuts provided with right-hand threads, will find numerous applications in all industries and may be made in a similar way with left-hand threads. They will be applicable to bolts of any kind whatsoever and to any screw threaded part of machinery, to screws, to shafting journals for laying fishplates, for motor-car brake rods, to straining devices, coupling boxes, and the like.

What I claim as my invention and desire to secure by Letters Patent is:—

1. In a lock-nut device, the combination with the screw-bolt and the parts to be held together thereby, of a bored ring loosely placed on the stem of the said screw-bolt and abutting against the said parts to be held together thereby, resilient tongues provided in the said ring by transverse saw cuts therein, so as to flex simultaneously in approaching each other thus acting as a spring on coming into engagement with one of the said parts to be held together, and an extensible conical ring adapted to be placed on the stem of the said screw-bolt and to engage a conical mortise provided in the said resilient ring, the latter constantly forcing the said conical ring into engagement with the said screw-bolt.

2. In a lock-nut device, the combination with a screw-bolt and the parts to be held together thereby, of a bored ring loosely placed on the stem of the said screw-bolt and abutting against one of the said parts to be held together, resilient tongues provided in the said ring by opposed transverse saw-cuts, an extensible conical ring adapted to be placed on the stem of the said screw-bolt and in engagement with a conical mortise in the said elastic ring, the latter constantly forcing the said extensible conical ring into engagement with the said screw-bolt.

3. In a lock-nut device, the combination with a screw-bolt and the parts to be held together thereby, of a bored ring loosely placed on the stem of the said screw-bolt and abutting against one of the said parts to be held together, elastic tongues provided in the said ring by means of transverse saw-cuts therein, an extensible conical ring made more resilient by radial saw-cuts provided in its surface and extending only partially through the height of the ring, the said extensible ring being mounted on the said screw-bolt in engagement with a conical mortise in the said resilient ring, the latter constantly forcing the said extensible conical ring into engagement with the said screw-bolt.

4. In a lock-nut device, the combination with a screw-bolt and the parts to be held together thereby, of a bored ring loosely placed on the stem of the said screw-bolt and abutting against one of the said parts to be held together, resilient tongues provided in the said ring by opposed transverse saw-cuts, an extensible conical ring mounted on the said screw-bolt and abutting against the head thereof and engaging in a conical mortise of the said resilient ring, the said extensible conical ring being constantly forced into engagement with the said screw-bolt by the said elastic ring.

In testimony whereof I affix my signature.

LÉOPOLD RAVIER.